US010903758B2

(12) United States Patent
Fu et al.

(10) Patent No.: US 10,903,758 B2
(45) Date of Patent: Jan. 26, 2021

(54) HYBRID MULTILEVEL INVERTERS WITH REDUCED VOLTAGE STRESS

(71) Applicant: Huawei Technologies Co., Ltd., Shenzhen (CN)

(72) Inventors: Dianbo Fu, Frisco, TX (US); Zhaohui Wang, Shanghai (CN); Lei Shi, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/566,242

(22) Filed: Sep. 10, 2019

(65) Prior Publication Data

US 2020/0007050 A1 Jan. 2, 2020

Related U.S. Application Data

(63) Continuation of application No. PCT/US2018/051724, filed on Sep. 19, 2018.
(Continued)

(51) Int. Cl.
*H02M 3/07* (2006.01)
*H02M 7/483* (2007.01)
(Continued)

(52) U.S. Cl.
CPC ............ *H02M 7/487* (2013.01); *H02M 7/483* (2013.01); *H02M 7/49* (2013.01); *H02M 2007/4835* (2013.01)

(58) Field of Classification Search
CPC ........ H02M 7/483; H02M 7/49; H02M 7/487; H02M 7/515; H02M 7/5387; H02M 2007/4835; H02M 3/07; H02M 3/073
See application file for complete search history.

(56) References Cited

U.S. PATENT DOCUMENTS 10,250,159 B2 * 4/2019 Wang .................... H02M 7/483
10,541,623 B1 * 1/2020 Michal .................. H02M 7/483
(Continued)

FOREIGN PATENT DOCUMENTS

| CN | 101640497 A | 2/2010 |
|----|-------------|--------|
| CN | 102148583 A | 8/2011 |

(Continued)

OTHER PUBLICATIONS

Y. Nakagawa et al., "A hybrid nine-level inverter with series/parallel conversion," 2017 IEEE International Symposium on Circuits and Systems (ISCAS), Baltimore, MD, 2017, pp. 1-4.
(Continued)

*Primary Examiner* — Thienvu V Tran
*Assistant Examiner* — Sisay G Tiku
(74) *Attorney, Agent, or Firm* — Slater Matsil, LLP

(57) ABSTRACT

A method comprises during a first half cycle, configuring a first switch to operate as an always-on switch, turning on a second switch prior to turning on a third switch and turning off the third switch prior to turning off the second switch, wherein the first switch and the second switch are connected in series and further in parallel with the third switch between a first terminal of a power source and a filter and during a second half cycle, configuring a fourth switch to operate as an always-on switch, turning on a fifth switch prior to turning on a sixth switch and turning off the sixth switch prior to turning off the fifth switch, wherein the fourth switch and the fifth switch are connected in series and further in parallel with the sixth switch between a second terminal of the power source and the filter.

20 Claims, 4 Drawing Sheets

Related U.S. Application Data

(60) Provisional application No. 62/562,565, filed on Sep. 25, 2017.

(51) Int. Cl.
*H02M 7/487* (2007.01)
*H02M 7/515* (2007.01)
*H02M 7/5387* (2007.01)
*H02M 7/49* (2007.01)

(56) References Cited

U.S. PATENT DOCUMENTS

| | | | |
|---|---|---|---|
| 2011/0193412 A1 | 8/2011 | Lacarnoy | |
| 2013/0107599 A1 | 5/2013 | Shekhawat et al. | |
| 2014/0098587 A1 | 4/2014 | Yatsu | |
| 2014/0293667 A1* | 10/2014 | Schroeder | H02M 7/483 363/60 |
| 2015/0256104 A1* | 9/2015 | Fu | H02M 7/537 363/131 |
| 2015/0263644 A1* | 9/2015 | Fu | H02M 7/487 363/95 |
| 2016/0043659 A1* | 2/2016 | Xu | H02M 1/088 363/131 |
| 2016/0268924 A1* | 9/2016 | Fu | H02M 7/483 |
| 2017/0338748 A1* | 11/2017 | Liang | H02M 7/537 |
| 2018/0115243 A1* | 4/2018 | Fu | H02M 3/158 |
| 2018/0219492 A1* | 8/2018 | Shi | H02M 7/483 |
| 2019/0058416 A1* | 2/2019 | Wang | H02M 7/48 |
| 2019/0157987 A1* | 5/2019 | Zmood | H02M 1/08 |
| 2019/0372353 A1* | 12/2019 | Fu | H02M 3/156 |

FOREIGN PATENT DOCUMENTS

| | | |
|---|---|---|
| CN | 103236796 A | 8/2013 |
| CN | 106031010 A | 10/2016 |
| CN | 106537754 A | 3/2017 |
| CN | 106559004 A | 4/2017 |
| EP | 2728734 A1 | 5/2014 |
| EP | 3174190 A1 | 5/2017 |

OTHER PUBLICATIONS

H. Wang et al., "A New Six-Switch Five-Level Active Neutral Point Clamped Inverter for PV Applications," IEEE Transactions on Power Electronics, vol. 32, No. 9, pp. 6700-6715, Sep. 2017.

\* cited by examiner

HYBRID MULTILEVEL INVERTERS WITH REDUCED VOLTAGE STRESS

CROSS REFERENCE TO RELATED APPLICATIONS

This application is a continuation of Application No. PCT/US2018/051724, entitled "Hybrid Multilevel Inverters" and filed on Sep. 19, 2018, which claims priority to U.S. Provisional Application No. 62/562,565, entitled, "Hybrid Multilevel Inverters" and filed on Sep. 25, 2017, each application is hereby incorporated herein by reference.

TECHNICAL FIELD

The present disclosure relates to a hybrid multilevel inverter, and, in particular embodiments, to a hybrid three-level inverter for solar applications.

BACKGROUND

Renewable energy sources include solar energy, wind power, tidal wave energy and the like. A solar power conversion system may include a plurality of solar panels connected in series or in parallel. The output of the solar panels may generate a variable dc voltage depending on a variety of factors such as time of day, location and sun tracking ability. In order to regulate the output of the solar panels, the output of the solar panels may be coupled to a dc/dc converter so as to achieve a regulated output voltage at the output of the dc/dc converter. In addition, the solar panels may be connected with a backup battery system through a battery charge control apparatus. During the day, the backup battery is charged through the output of the solar panels. When the power utility fails or the solar panels are an off-grid power system, the backup battery provides electricity to the loads coupled to the solar panels.

Since the majority of applications may be designed to run on 120 volts ac power, a solar inverter is employed to convert the variable dc output of the photovoltaic modules to a 120 volts ac power source. A plurality of multilevel inverter topologies may be employed to achieve high power as well as high efficiency conversion from solar energy to utility electricity. In particular, a high power ac output can be achieved by using a series of power semiconductor switches to convert a plurality of low voltage dc sources to a high power ac output by synthesizing a staircase voltage waveform.

In accordance with the topology difference, multilevel inverters may be divided into three categories, namely diode clamped multilevel inverters, flying capacitor multilevel inverters and cascaded H-bridge multilevel inverters. Furthermore, multilevel inverters may employ different pulse width modulation (PWM) techniques such as sinusoidal PWM (SPWM), selective harmonic elimination PWM, space vector modulation and the like. Multilevel inverters are a common power topology for high and medium power applications such as utility interface for renewable power sources, flexible ac transmission systems, medium voltage motor drive systems and the like.

SUMMARY

These and other problems are generally solved or circumvented, and technical advantages are generally achieved, by preferred embodiments of the present disclosure which provide a hybrid three-level inverter having lower on-resistance and lower switching losses.

In accordance with an embodiment, an inverter comprises a first switch and a second switch connected in series between a first terminal and a second terminal of an input power source. The inverter comprises a filter connected to a common node of the first switch and the second switch. The inverter further comprises a plurality of low-voltage switches connected between the filter and ground, wherein four switches of the plurality of low-voltage switches are connected in series between the first terminal and the second terminal of the input power source, and a flying capacitor connected in series with two low-voltage switches of the plurality of low voltage switches. The flying capacitor is configured to reduce voltage stresses on the plurality of low-voltage switches.

In accordance with another embodiment, a method comprises during a first half of a cycle of an inverter, configuring a first switch to operate as an always-on switch, turning on a second switch prior to turning on a third switch and turning off the third switch prior to turning off the second switch, The method further comprises during a second half of the cycle of the inverter, configuring a fourth switch to operate as an always-on switch, turning on a fifth switch prior to turning on a sixth switch and turning off the sixth switch prior to turning off the fifth switch.

In accordance with yet another embodiment, a system comprises a first input capacitor and a second input capacitor connected in series across two terminals of an input power source. The system further comprises an inverting unit coupled to the input power source. The inverting unit comprises an upper portion and a lower portion connected in series, and a flying capacitor between the upper portion and the lower portion. The flying capacitor is configured to reduce voltage stresses on the inverting unit. The system also comprises a filter connected to a common node of the upper portion and the lower portion of the inverting unit.

An advantage of an embodiment of the present disclosure is a hybrid three-level inverter providing lower on-resistance and lower switching losses so as to improve the efficiency, reliability and cost of the hybrid three-level inverter.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a three-level inverter. The present disclosure may also be applied, however, to a variety of multilevel inverters including five-level inverters, seven-level inverters, nine-level inverters and the like. Hereinafter, various embodiments will be explained in detail with reference to the accompanying drawings.

Figure 1:
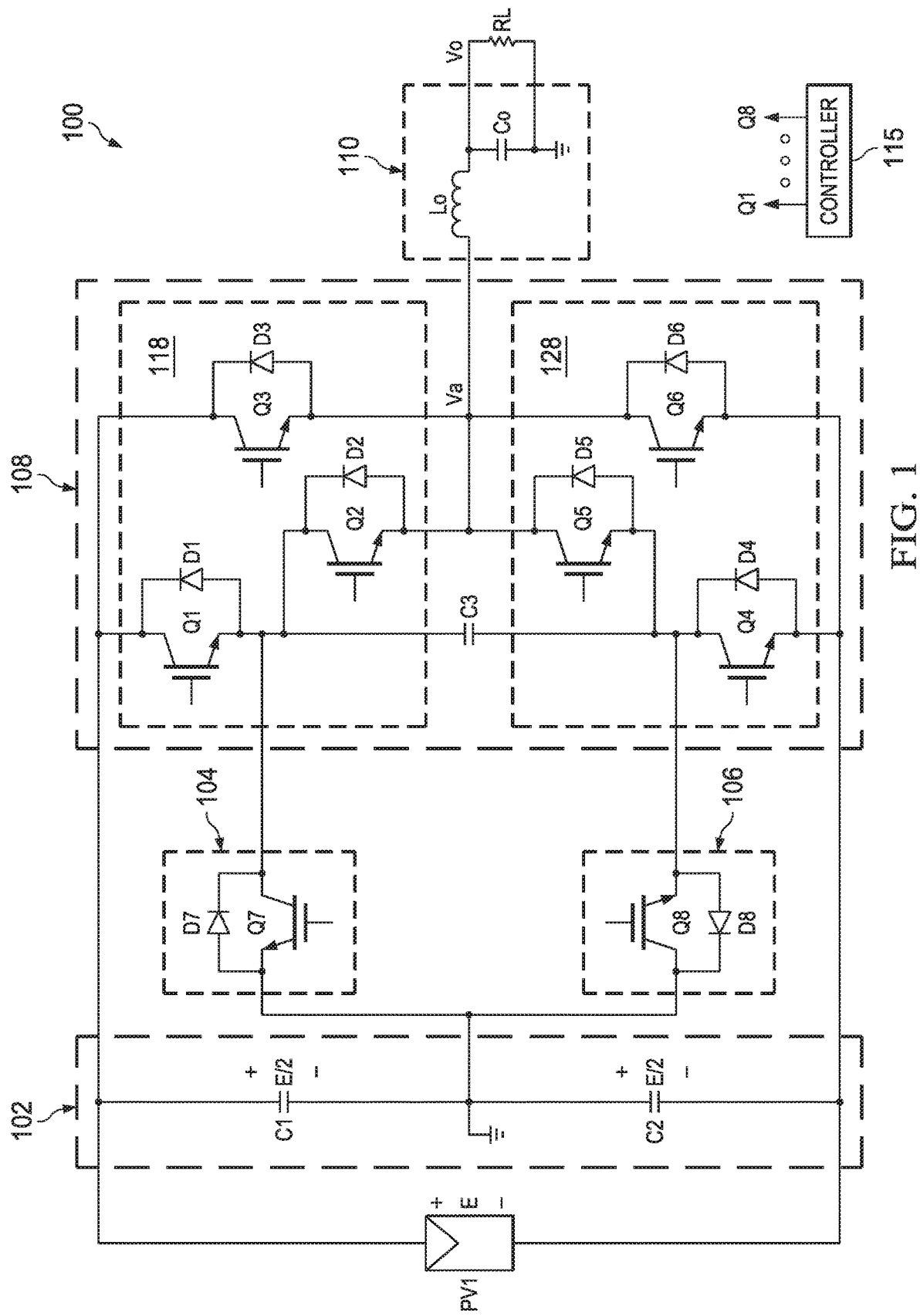
FIG. 1 illustrates a schematic diagram of a hybrid three-level inverter in accordance with various embodiments of the present disclosure.

FIG. 1 illustrates a schematic diagram of a hybrid three-level inverter in accordance with various embodiments of the present disclosure. The hybrid three-level inverter 100 is coupled between an input direct current (dc) power source PV1 and a load RL as shown in FIG. 1. The input dc power source PV1 may be a solar panel array. Alternatively, the input dc power source PV1 may be an energy storage device such as rechargeable batteries, fuel cells and/or the like. The output voltage of the input power source PV1 is equal to E as shown in FIG. 1.

As shown in FIG. 1, the hybrid three-level inverter 100 comprises an input dc link 102, a first conductive path 104, a second conductive path 106, an inverting unit 108 and an output inductor-capacitor (L-C) filter 110. As shown in FIG. 1, the first conductive path 104 and the second conductive path 106 are coupled between the input dc link 102 and the inverting unit 108. The output L-C filter 110 is coupled between the inverting unit 108 and the load RL. More particularly, the output L-C filter 110 has an input connected to a node Va and an output connected to a node Vo as shown in FIG. 1.

The input dc link 102 comprises two input capacitors, namely a first capacitor C1 and a second capacitor C2 connected in series between two output terminals of the input dc power source PV1. In some embodiment, the first capacitor C1 and the second capacitor C2 have the same capacitance. As a result, the voltage applied to the input dc link 102 is divided evenly across each capacitor. More particularly, the first capacitor C1 has an output voltage E/2 with reference to the common node of capacitors C1 and C2. Likewise, the second capacitor C2 has an output voltage −E/2 with reference to the common node of capacitors C1 and C2. The common node of capacitors C1 and C2 is connected to ground according to some embodiments. The common node of capacitors C1 and C2 may be alternatively referred to as a neutral point of the hybrid three-level inverter 100 throughout the description.

It should be noted that while FIG. 1 illustrates the hybrid three-level inverter 100 with two input capacitors (e.g., the first capacitor C1 and the second capacitor C2), the hybrid three-level inverter 100 could accommodate any number of input capacitors. The number of input capacitors illustrated herein is limited solely for the purpose of clearly illustrating the inventive aspects of the various embodiments. The present disclosure is not limited to any specific number of input capacitors. One of ordinary skill in the art would recognize many variations, alternatives, and modifications. For example, additional capacitors may be employed to achieve an output staircase waveform having additional voltage levels.

As shown in FIG. 1, the inverting unit 108 comprises an upper portion 118, a lower portion 128 and a flying capacitor C3. The upper portion 118 and the lower portion 128 are connected in series across the two terminals of the input dc power source PV1. The flying capacitor C3 is placed between the upper portion 118 and the lower portion 128. The upper portion 118 of the inverting unit 108 comprises a first switch Q1, a second switch Q2 and a third switch Q3. The lower portion 128 of the inverting unit 108 comprises a fourth switch Q4, a fifth switch Q5 and a sixth switch Q6. Node Va is a common node of the upper portion 118 and the lower portion 128.

As shown in FIG. 1, the first switch Q1 and the second switch Q2 are connected in series and further connected in parallel with the third switch Q3. The fourth switch Q4 and the fifth switch Q5 are connected in series and further connected in parallel with the sixth switch Q6. The flying capacitor C3 is connected between a common node of the first switch Q1 and the second switch Q2, and a common node of the fourth switch Q4 and the fifth switch Q5. Furthermore, a common node of the third switch Q3 and the sixth switch Q6 is connected to a common node of the second switch Q2 and the fifth switch Q5.

In operation, the second switch Q2 and the fifth switch Q5 are controlled by a pair of control signals complementary to each other. By controlling the on and off states of switches Q1-Q8, the node Va may have three different voltage levels. The three voltage levels at the node Va include E/2, 0 and −E/2. After passing the output L-C filter 110, the voltage waveform at the node Va becomes a sinusoidal waveform at the node Vo.

In operation, during a first half of a cycle of the hybrid three-level inverter 100, the first switch Q1 is configured to operate as an always-on switch. The second switch Q2 and the fifth switch Q5 are controlled by two complementary signals. The control signal of the third switch Q3 is similar to the control signal applied to the second switch Q2 except that two delays have been added into the control signal applied to the third switch Q3. A first delay is added between the turn-on of the second switch Q2 and the turn-on of the third switch Q3. A second delay is added between the turn-off of the third switch Q3 and the turn-off the second switch Q2 In some embodiments, the first delay is about two microseconds. The second delay is about two microseconds.

In some embodiments, during a second half of the cycle of the hybrid three-level inverter, the fourth switch Q4 is configured to operate as an always-on switch. The second switch Q2 and the fifth switch Q5 are controlled by two complementary signals. In addition, during the second half, the fifth switch Q5 is turned on prior to turning on the sixth switch Q6. The sixth switch Q6 is turned off prior to turning off the fifth switch Q5. A third delay is added between the turn-on of the fifth switch Q5 and the turn-on of the sixth switch Q6. A fourth delay is added between the turn-off of the sixth switch Q6 and the turn-off of the fifth switch Q5. In some embodiments, the third delay is about two microseconds. The fourth delay is about two microseconds. The detailed control of the upper portion 118 and the lower portion 128 of the inverting unit 108 will be described below with respect to FIG. 2.

This delay time provided above is merely an example, which should not unduly limit the scope of the claims. One of ordinary skill in the art would recognize many variations, alternatives, and modifications. For example, depending on different design needs and applications, the delay time may change accordingly.

One advantageous feature of having the third switch Q3 and the sixth switch Q6 is these two switches provide additional conductive paths between the input power source and the load RL. The additional conductive paths help to reduce the on resistance of the hybrid three-level inverter 100, thereby reducing power losses and improving efficiency.

The flying capacitor C3 functions as a clamping capacitor. In particular, the flying capacitor C3 is employed to clamp voltages across the fifth switch Q5 and the sixth switch Q6 to a level approximately equal to E/2, thereby reducing the voltage stresses on the fifth switch Q5 and the sixth switch Q6.

The first conductive path 104 is connected between the common node of the first switch Q1 and the second switch Q2, and a common node of the first input capacitor C1 and the second input capacitor C2. The second conductive path 106 is connected between the common node of the fourth switch Q4 and the fifth switch Q5, and the common node of the first input capacitor C1 and the second input capacitor C2.

In some embodiments, the first conductive path 104 and the second conductive path 106 function as freewheeling paths between the inverting unit 108 and ground. In particular, during the first half of the cycle of the hybrid three-level inverter 100, the switch of the second conductive path 106 is configured to be an always-on switch and the switch of the first conductive path 104 is configured to be an always-off switch. On the other hand, during the second half of the cycle of the hybrid three-level inverter 100, the switch of the first conductive path 104 is configured to be an always-on switch and the switch of the second conductive path 106 is configured to be an always-off switch.

As shown in FIG. 1, the first conductive path 104 comprises a seventh switch Q7. In some embodiments, the seventh switch Q7 is implemented as an IGBT. The seventh switch Q7 has a collector connected to the common node of the first switch Q1 and the second switch Q2, and an emitter connected to the common node of the first input capacitor C1 and the second input capacitor C2.

The second conductive path 106 comprises an eighth switch Q8. In some embodiments, the eighth switch Q8 is implemented as an IGBT. As shown in FIG. 1, the eighth switch Q8 has a collector connected to the common node of the first input capacitor C1 and the second input capacitor C2, and an emitter connected to the common node of the fourth switch Q4 and the fifth switch Q5.

It should further be noted that while FIG. 1 shows each conductive path is formed by a diode and an IGBT device connected in an anti-parallel arrangement, one of ordinary skill in the art would recognize many variations, alternatives and modifications. For example, the conductive path shown in FIG. 1 may be formed by a bidirectional switch.

The output L-C filter 110 comprises an inductor Lo and a capacitor Co. As shown in FIG. 1, an input of the output L-C filter 110 is connected to a common node of the upper portion 118 and the lower portion 128 of the inverting unit 108. An output of the output L-C filter 110 is connected to the load RL. As shown in FIG. 1, the output of the output L-C filter 110 is the common node of the inductor Lo and the capacitor Co.

In accordance with an embodiment, the switches (e.g., switches Q1-Q8) shown in FIG. 1 may be implemented as IGBT devices. Alternatively, the switching element can be any controllable switches such as metal oxide semiconductor field-effect transistor (MOSFET) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices and the like.

It should be noted that when switches Q1-Q8 are implemented by MOSFET devices, the body diodes of switches Q1-Q8 can be used to provide a freewheeling channel. On the other hand, when switches Q1-Q8 are implemented by IGBT devices, a separate freewheeling diode is required to be connected in parallel with its corresponding switch.

As shown in FIG. 1, diodes D1, D2, D3, D4, D5, D6, D7 and D8 are required to provide reverse conducting paths for the hybrid three-level inverter 100. In other words, diodes D1-D8 are anti-parallel diodes. In some embodiments, diodes D1-D8 are co-packaged with their respective IGBT devices. In alternative embodiments, didoes D1-D8 are placed outside their respective IGBT devices. The operation scheme of switches Q1-Q8 will be described below with respect to FIGS. 2-4.

In some embodiments, for 1000 V applications (e.g., an output voltage of the input power source is about 1000 V), a voltage rating of the first switch Q1, the second switch Q2, the fourth switch Q4, the fifth switch Q5, the seventh switch Q7 and the eighth switch Q8 is about 650 V. A voltage rating of the third switch Q3 and the sixth switch Q6 is about 1200 V.

It should be noted that the voltage ratings above are merely examples. One of ordinary skill in the art would recognize many variations, alternatives, and modifications. For example, depending on different applications and design needs, the voltage rating of the third switch Q3 may be in a range from about 1000 V to about 1500 V.

The gates of switches Q1-Q8 are controlled by a controller 115 as shown in FIG. 1. The controller 115 may detect the voltage across the output of the hybrid three-level inverter 100. Based upon the detected voltage, the controller 115 generates gate drive signals to control the on/off of the second switch Q2 and the fifth switch Q5. Alternatively, the controller 115 generates gate drive signals to control the on/off of the second switch Q2 and the fifth switch Q5 based upon a control signal from a system manager (not shown). The detailed operation principle of the controller 115 will be described below with respect to FIG. 2.

It should further be noted that while FIG. 1 shows a controller is employed to generate the gate signals for the hybrid three-level inverter 100, a person skilled in the art will recognize that there may be a variety of alternatives for implementing the function of the controller 115. For example, the controller 115 may be replaced by discrete components. Furthermore, there may be one dedicated driver or multiple dedicated drivers coupled between the controller 115 and the switches Q1-Q8.

Figure 2:
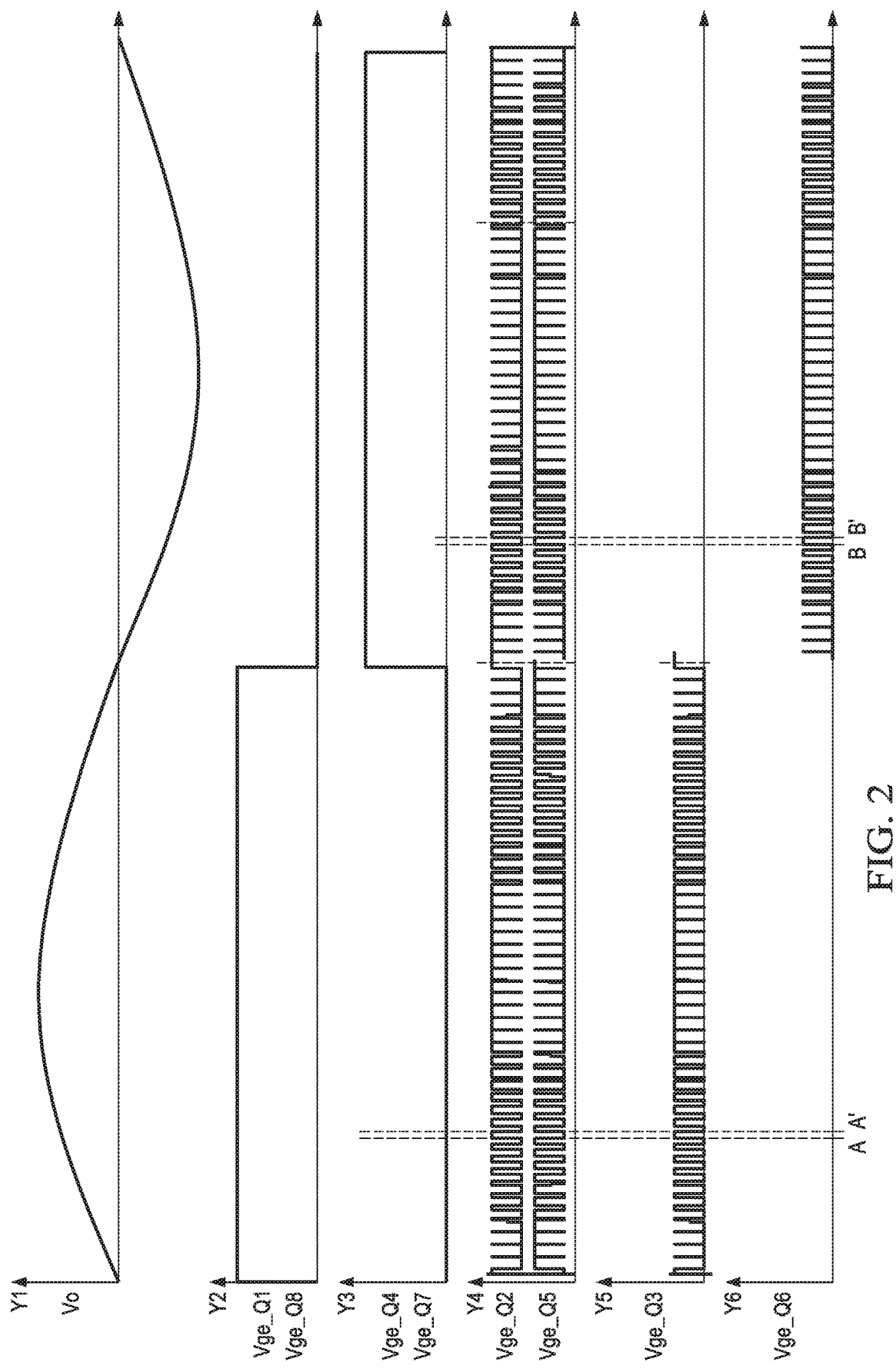
FIG. 2 illustrates various control signals and an inverter output waveform of the hybrid three-level inverter shown in FIG. 1 in accordance with various embodiments of the present disclosure.

FIG. 2 illustrates various control signals and an inverter output waveform of the hybrid three-level inverter shown in FIG. 1 in accordance with various embodiments of the present disclosure. The horizontal axis of FIG. 2 represents intervals of time. There may be six vertical axes. The first vertical axis Y1 represents the voltage at the node Vo of FIG. 1. The second vertical axis Y2 represents gate drive signals of the first switch Q1 and the eighth switch Q8. The third vertical axis Y3 represents gate drive signals of the fourth switch Q4 and the seventh switch Q7. The fourth vertical axis Y4 represents gate drive signals of the second switch Q2 and the fifth switch Q5. The fifth vertical axis Y5 represents the gate drive signal of the third switch Q3. The sixth vertical axis Y6 represents the gate drive signal of the sixth switch Q6.

As shown in FIG. 2, the waveform Vo is a sinusoidal waveform. Referring back to FIG. 1, at the node Va, the waveform is a three-level waveform, which resembles the sinusoidal waveform shown in FIG. 2. The output L-C filter 110 placed between node Va and node Vo reduces the harmonic content of the three-level waveform and generates the sinusoidal waveform shown in FIG. 2.

The sinusoidal waveform shown in FIG. 2 illustrates one cycle of the hybrid three-level inverter 100. In some embodiments, the output voltage of the hybrid three-level inverter 100 oscillates at a rate of 60 complete back-and-forth cycles every second. In alternative embodiments, the output voltage of the hybrid three-level inverter 100 oscillates at a rate of 50 complete back-and-forth cycles every second.

During a first half of the cycle, the first switch Q1 and the eighth switch Q8 are configured to operate as always-on switches as indicated by the gate drive signals of the first switch Q1 and the eighth switch Q8. The fourth switch Q4 and the seventh switch Q7 are configured to operate as always-off switches as indicated by the gate drive signals of the fourth switch Q4 and the seventh switch Q7 shown in FIG. 2.

During a second half of the cycle, the fourth switch Q4 and the seventh switch Q7 are configured to operate as always-on switches as indicated by the gate drive signals of the fourth switch Q4 and the seventh switch Q7. The first switch Q1 and the eighth switch Q8 are configured to operate as always-off switches as indicated by the gate drive signals of the first switch Q1 and the eighth switch Q8 shown in FIG. 2.

During the first half and the second half of the cycle, the second switch Q2 and the fifth switch Q5 are controlled by a pair of control signals complementary to each other. Referring back to FIG. 1, the controller 115 is employed to control the turn-on and turn-off of the second switch Q2 and the fifth switch Q5. Depending on different applications and a variety of detected operation parameters, the controller 115 may adjust the operation of the second switch Q2 and the fifth switch Q5 accordingly.

During the first half, the third switch Q3 is controlled by a first pulse width modulation (PWM) signal generated by the controller 115 shown in FIG. 1. During the second half, the third switch Q3 is configured to operate as an always-off switch as indicated by the gate drive signal of the third switch Q3.

During the first half, the third switch Q3 is turned on after the second switch Q2 has been turned on. The third switch Q3 is turned off before the second switch Q2 has been turned off. The detailed timing control of the second switch Q2 and the third switch Q3 will be described below with respect to FIG. 3.

During the first half, the sixth switch Q6 is configured to operate as an always-off switch as indicated by the gate drive signal of the sixth switch Q6. During the second half, the sixth switch Q6 is controlled by a second PWM signal generated by the controller 115.

During the second half, the sixth switch Q6 is turned on after the fifth switch Q5 has been turned on. The sixth switch Q6 is turned off before the fifth switch Q5 has been turned off. The detailed timing control of the fifth switch Q5 and the sixth switch Q6 will be described below with respect to FIG. 4.

Figure 3:
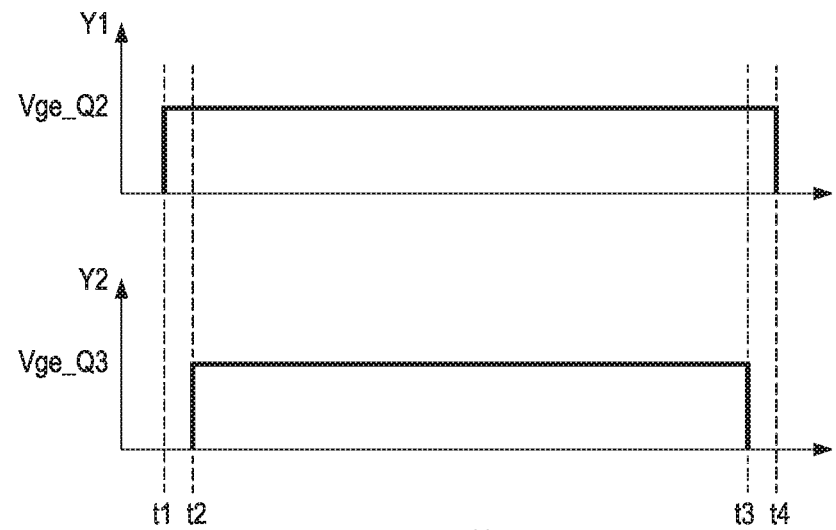
FIG. 3 illustrates the gate control signals of the second switch and the third switch of the hybrid three-level inverter shown in FIG. 1 in accordance with various embodiments of the present disclosure.

FIG. 3 illustrates the gate control signals of the second switch and the third switch of the hybrid three-level inverter shown in FIG. 1 in accordance with various embodiments of the present disclosure. The horizontal axis of FIG. 3 represents intervals of time. There may be two vertical axes. The first vertical axis Y1 represents the gate drive signal of the second switch Q2. The second vertical axis Y2 represents the gate drive signal of the third switch Q3.

FIG. 3 illustrates in detail the gate control signals of the second switch Q2 and the third switch Q3 between the dashed lines A-A' shown in FIG. 2. As shown in FIG. 3, the second switch Q2 is turned on at t1. After a first delay, the third switch Q3 is turned on at t2. The first delay has a predetermined value. In some embodiments, the first delay is about two microseconds. The third switch Q3 is turned off at t3. After a second delay, the second switch Q2 is turned off at t4. The second delay has a predetermined value. In some embodiments, the second delay is about two microseconds.

Figure 4:
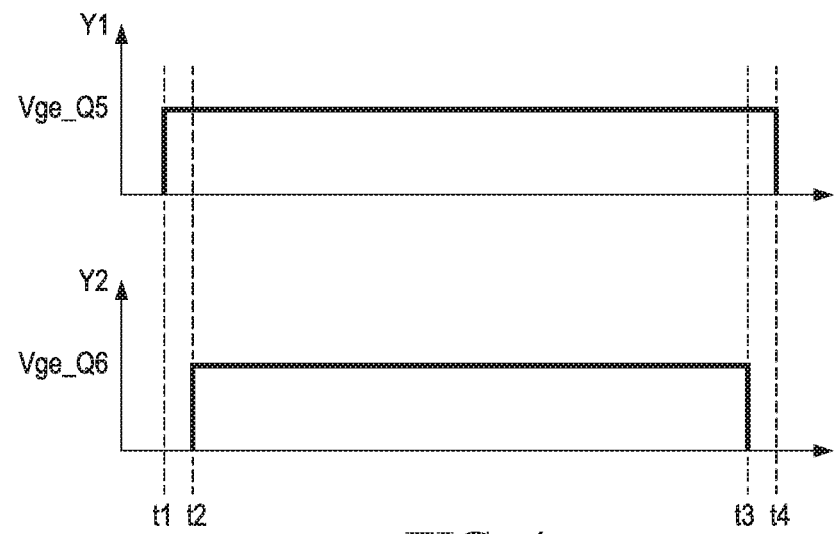
FIG. 4 illustrates the gate control signals of the fifth switch and the sixth switch of the hybrid three-level inverter shown in FIG. 1 in accordance with various embodiments of the present disclosure.

FIG. 4 illustrates the gate control signals of the fifth switch and the sixth switch of the hybrid three-level inverter shown in FIG. 1 in accordance with various embodiments of the present disclosure. The horizontal axis of FIG. 4 represents intervals of time. There may be two vertical axes. The first vertical axis Y1 represents the gate drive signal of the fifth switch Q5. The second vertical axis Y2 represents the gate drive signal of the sixth switch Q6.

FIG. 4 illustrates in detail the gate control signals of the fifth switch Q5 and the sixth switch Q6 between the dashed lines B-B' shown in FIG. 2. As shown in FIG. 4, the fifth switch Q5 is turned on at t1. After a first delay, the sixth switch Q6 is turned on at t2. The first delay has a predetermined value. In some embodiments, the first delay is about two microseconds. The sixth switch Q6 is turned off at t3. After a second delay, the fifth switch Q5 is turned off at t4. The second delay has a predetermined value. In some embodiments, the second delay is about two microseconds.

Figure 5:
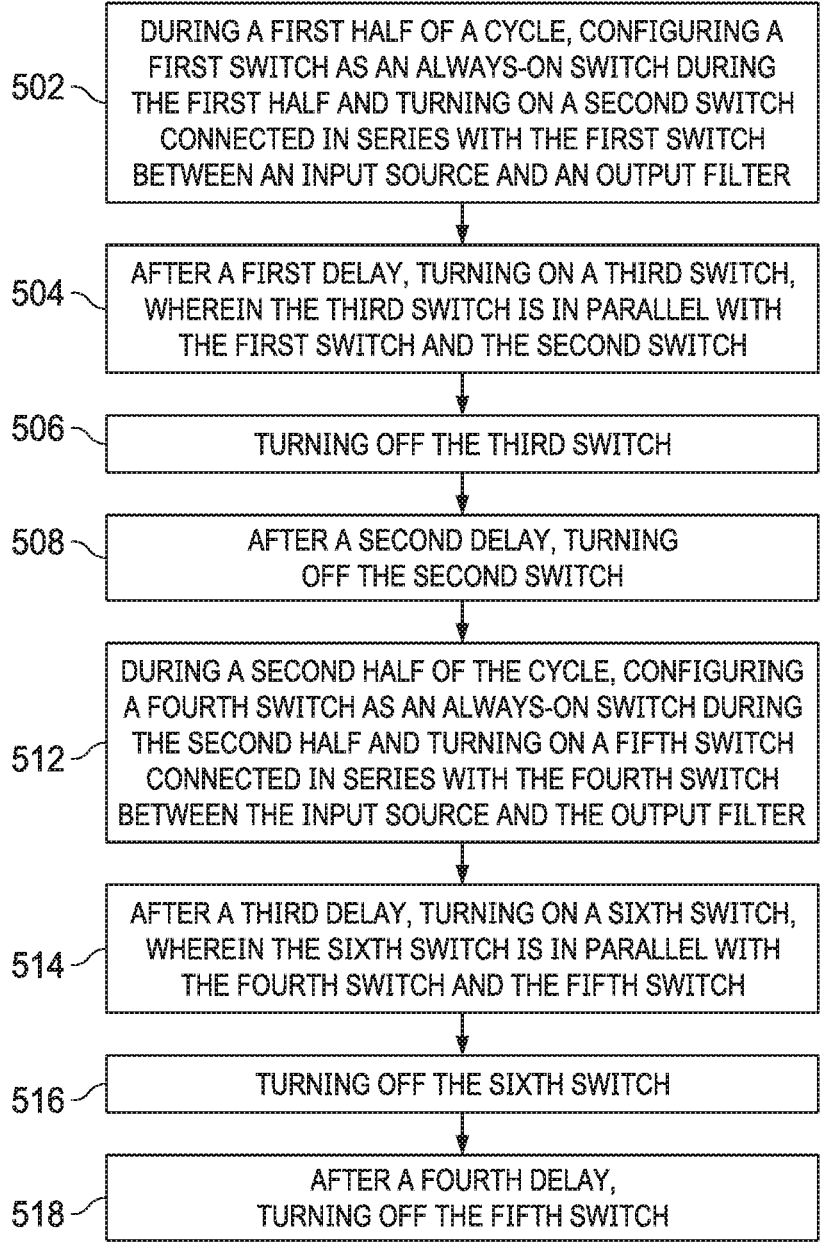
FIG. 5 illustrates a flow chart of a method for controlling the hybrid three-level inverter shown in FIG. 1 in accordance with various embodiments of the present disclosure.

FIG. 5 illustrates a flow chart of a method for controlling the hybrid three-level inverter shown in FIG. 1 in accordance with various embodiments of the present disclosure. This flowchart shown in FIG. 5 is merely an example, which should not unduly limit the scope of the claims. One of ordinary skill in the art would recognize many variations, alternatives, and modifications. For example, various steps illustrated in FIG. 5 may be added, removed, replaced, rearranged and repeated.

At step 502, during a first half of a cycle of the hybrid three-level inverter 100 shown in FIG. 1, a first switch Q1 is configured to operate as an always-on switch during the first half and a second switch Q2 is turned on in response to a gate drive signal from the controller 115, wherein the second switch Q2 is connected in series with the first switch Q1 between an input source and an output filter.

At step 504, after a first delay, a third switch Q3 is turned on, wherein the third switch Q3 is in parallel with the first switch Q1 and the second switch Q2 as shown in FIG. 1. The second switch Q2 is turned on prior to the turn-on of the third switch Q3. The first delay is a predetermined value. The first delay may vary depending on different applications and design needs.

At step 506, the third switch Q3 is turned off prior to the turn-off the second switch Q2. At step 508, after a second delay, the second switch Q2 is turned off. The second delay is a predetermined value. The second delay may vary depending on different applications and design needs.

At step 512, during a second half of the cycle of the hybrid three-level inverter 100 shown in FIG. 1, a fourth switch Q4 is configured to operate as an always-on switch during the second half and a fifth switch Q5 is turned on in response to a gate drive signal from the controller 115, wherein the fifth switch Q5 is connected in series with the fourth switch Q4 between the input source and the output filter.

At step 514, after a third delay, a sixth switch Q6 is turned on, wherein the sixth switch Q6 is in parallel with the fourth switch Q4 and the fifth switch Q5. The fifth switch Q5 is turned on prior to the turn-on of the sixth switch Q6. The third delay is a predetermined value. The third delay may vary depending on different applications and design needs.

At step 516, the sixth switch Q6 is turned off prior to the turn-off the fifth switch Q5. At step 518, after a fourth delay, the fifth switch Q5 is turned off. The fourth delay is a predetermined value. The fourth delay may vary depending on different applications and design needs.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An inverter comprising:
   a first switch and a second switch connected in series between a first terminal and a second terminal of an input power source;
   a filter connected to a common node of the first switch and the second switch;
   a plurality of low-voltage switches connected between the filter and ground, wherein a third switch, a fourth switch, a fifth switch and a sixth switch of the plurality of low-voltage switches are connected in series between the first terminal and the second terminal of the input power source, and wherein the first switch is configured to be turned on after the fourth switch has been turned on, and the first switch is configured to be turned off before the fourth switch has been turned off; and
   a flying capacitor connected in series with two low-voltage switches of the plurality of low-voltage switches, wherein the flying capacitor is configured to reduce voltage stresses on the plurality of low-voltage switches.

2. The inverter of claim 1, wherein the plurality of low-voltage switches comprises:
   the third switch and the sixth switch connected in series with the flying capacitor and further coupled between the first terminal and the second terminal of the input power source;
   the fifth switch and the fourth switch connected in series between a common node of the third switch and the flying capacitor, and a common node of the sixth switch and the flying capacitor, wherein the common node of the first switch and the second switch is connected to a common node of the fifth switch and the fourth switch;
   a seventh switch connected between the common node of the third switch and the flying capacitor, and a common node of a first capacitor and a second capacitor, wherein the first capacitor and the second capacitor are connected in series between the first terminal and the second terminal of the input power source; and
   an eighth switch connected between the common node of the sixth switch and the flying capacitor, and the common node of the first capacitor and the second capacitor.

3. The inverter of claim 2, wherein:
   the first switch, the second switch, the third switch, the fourth switch, the fifth switch, the sixth switch, the seventh switch and the eighth switch are Insulated Gate Bipolar Transistor (IGBT) devices.

4. The inverter of claim 2, wherein:
   an output voltage of the input power source is substantially equal to 1000 V;
   a voltage rating of the third switch, the fourth switch, the fifth switch, the sixth switch, the seventh switch and the eighth switch is substantially equal to 650 V; and
   a voltage rating of the first switch and the second switch is substantially equal to 1200 V.

5. The inverter of claim 2, wherein:
   the common node of the first capacitor and the second capacitor is connected to the ground.

6. The inverter of claim 2, wherein:
   the seventh switch is a first IGBT device, wherein an emitter of the first IGBT device is connected to the ground and a collector of the first IGBT device is connected to the common node of the third switch and the flying capacitor.

7. The inverter of claim 2, wherein:
   the eighth switch is a second IGBT device, wherein a collector of the second IGBT device is connected to the ground and an emitter of the second IGBT device is connected to the common node of the sixth switch and the flying capacitor.

8. The inverter of claim 2, wherein:
   the input power source is a solar panel array.

9. The inverter of claim 2, wherein:
   a voltage across two terminals of the first capacitor is equal to one half of an output voltage of the input power source.

10. A method comprising:
providing an inverter comprising a first switch, a second switch, a fifth switch, a fourth switch connected in series, a third switch connected to a common node of the second switch and the fifth switch, and a sixth switch connected to the common node of the second switch and the fifth switch;
during a first half of a cycle of the inverter, configuring the first switch to operate as an always-on switch, turning on the second switch prior to turning on the third switch, and turning off the third switch prior to turning off the second switch; and
during a second half of the cycle of the inverter, configuring the fourth switch to operate as an always-on switch, turning on the fifth switch prior to turning on the sixth switch, and turning off the sixth switch prior to turning off the fifth switch.

11. The method of claim 10, wherein:
the first switch and the second switch are connected in series and further in parallel with the third switch between a first terminal of an input power source and an input of a filter; and
the fourth switch and the fifth switch are connected in series and further in parallel with the sixth switch between a second terminal of the input power source and the input of the filter.

12. The method of claim 11, the inverter comprises:
the first switch, a capacitor and the fourth switch connected in series between the first terminal and the second terminal of the input power source;
a first capacitor and a second capacitor connected in series between the first terminal and the second terminal of the input power source;
a seventh switch connected between a common node of the first switch and the capacitor, and a common node of the first capacitor and the second capacitor;
an eighth switch connected between a common node of the fourth switch and the capacitor, and the common node of the first capacitor and the second capacitor;
the second switch and the fifth switch connected in series between the common node of the first switch and the capacitor, and the common node of the fourth switch and the capacitor; and
the third switch and the sixth switch connected in series between the first terminal and the second terminal of the input power source, wherein a common node of the third switch and the sixth switch is connected to a common node of the second switch and the fifth switch.

13. The method of claim 12, further comprising:
supplying control signals to the first switch, the second switch, the third switch, the fourth switch, the fifth switch, the sixth switch, the seventh switch and the eighth switch, wherein the control signals are configured such that three voltage potentials are produced at the input of the filter.

14. The method of claim 13, further comprising:
during the first half of the cycle of the inverter, configuring the eighth switch to operate as an always-on switch; and
during the second half of the cycle of the inverter, configuring the seventh switch to operate as an always-on switch.

15. The method of claim 10, further comprising:
during the first half of the cycle, after turning on the second switch and a first delay, turning on the third switch; and
after turning off the third switch and a second delay, turning off the second switch.

16. The method of claim 10, further comprising:
during the second half of the cycle, after turning on the fifth switch and a third delay, turning on the sixth switch; and
after turning off the sixth switch and a fourth delay, turning off the fifth switch.

17. A system comprising:
a first input capacitor and a second input capacitor connected in series across two terminals of an input power source;
an inverting unit coupled to the input power source, the inverting unit comprising an upper portion and a lower portion connected in series, and a flying capacitor between the upper portion and the lower portion, wherein the flying capacitor is configured to reduce voltage stresses on the inverting unit, and wherein the upper portion comprises a first leg and a second leg connected in parallel, and wherein the first leg is formed by an upper switch and a lower switch, and the second leg is formed by a single switch, and wherein the single switch is configured to be turned on after the lower switch has been turned on, and the single switch is configured to be turned off before the lower switch has been turned off; and
a filter connected to a common node of the upper portion and the lower portion of the inverting unit.

18. The system of claim 17, wherein:
the upper portion comprises a first switch and a second switch connected in series and further connected in parallel with a third switch;
the lower portion comprises a fourth switch and a fifth switch connected in series and further connected in parallel with a sixth switch;
the flying capacitor is connected between a common node of the first switch and the second switch, and a common node of the fourth switch and the fifth switch;
a first conductive path is connected between the common node of the first switch and the second switch, and a common node of the first input capacitor and the second input capacitor; and
a second conductive path is connected between the common node of the fourth switch and the fifth switch, and the common node of the first input capacitor and the second input capacitor.

19. The system of claim 18, wherein:
the first conductive path is formed by a first IGBT having a collector connected to the common node of the first switch and the second switch and an emitter connected to the common node of the first input capacitor and the second input capacitor; and
the second conductive path is formed by a second IGBT having a collector connected to the common node of the first input capacitor and the second input capacitor and an emitter connected to the common node of the fourth switch and the fifth switch.

20. The system of claim 18, wherein:
at least one switch of the first switch, the second switch, the third switch, the fourth switch, the fifth switch and the sixth switch comprises an IGBT and a diode connected in parallel.

* * * * *